US012432669B2

(12) United States Patent
Zhang et al.

(10) Patent No.: US 12,432,669 B2
(45) Date of Patent: Sep. 30, 2025

(54) METHOD FOR CONTROLLING ELECTRONIC DEVICE, ELECTRONIC DEVICE AND READABLE STORAGE MEDIUM

(71) Applicant: BEIJING XIAOMI MOBILE SOFTWARE CO., LTD., Beijing (CN)

(72) Inventors: Hua Zhang, Beijing (CN); Deqian Wang, Beijing (CN); Shui Liu, Beijing (CN); Xin Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 554 days.

(21) Appl. No.: 17/853,338

(22) Filed: Jun. 29, 2022

(65) Prior Publication Data

US 2023/0164707 A1 May 25, 2023

(30) Foreign Application Priority Data

Nov. 19, 2021 (CN) .......................... 202111401211.2

(51) Int. Cl.
*H04W 52/36* (2009.01)
*H04W 52/22* (2009.01)

(52) U.S. Cl.
CPC ....... *H04W 52/367* (2013.01); *H04W 52/225* (2013.01)

(58) Field of Classification Search
CPC ............. H04W 52/367; H04W 52/225; H04W 52/146; H04W 52/241; H04W 52/228; Y02D 30/70
See application file for complete search history.

(56) References Cited

U.S. PATENT DOCUMENTS

| 10,129,834 | B2 | 11/2018 | Yao et al. | |
|---|---|---|---|---|
| 11,153,831 | B1* | 10/2021 | Shvodian | H04W 52/146 |
| 2007/0111681 | A1 | 5/2007 | Alberth et al. | |
| 2012/0270519 | A1 | 10/2012 | Ngai et al. | |
| 2012/0270592 | A1* | 10/2012 | Ngai | H04W 52/226 455/522 |
| 2017/0064641 | A1* | 3/2017 | Logan | H04W 52/367 |
| 2020/0383068 | A1 | 12/2020 | Yang et al. | |

FOREIGN PATENT DOCUMENTS

| CN | 109391904 A | 2/2019 |
|---|---|---|
| CN | 113163435 A | 7/2021 |

OTHER PUBLICATIONS

European Patent Application No. 22181852.9, Search and Opinion dated Dec. 13, 2022, 8 pages.
Chinese Patent Application No. 202111401211.2, Office Action with English translation dated Jun. 23, 2025, 12 pages.
Indian Patent Application No. 202244037390, Office Action dated Jul. 30, 2025, 3 pages.

* cited by examiner

*Primary Examiner* — Sun Jong Kim
(74) *Attorney, Agent, or Firm* — Cozen O'Connor

(57) ABSTRACT

A method for controlling an electronic device includes obtaining a service scenario of the electronic device; determining an upper limit value and/or a lower limit value of a transmit power based on the service scenario; controlling the electronic device to transmit and receive signals by using the transmit power, and making an average value of the transmit power satisfy an SAR requirement.

14 Claims, 5 Drawing Sheets

METHOD FOR CONTROLLING ELECTRONIC DEVICE, ELECTRONIC DEVICE AND READABLE STORAGE MEDIUM

CROSS-REFERENCE TO RELATED APPLICATION

This application is based upon and claims priority to Chinese Patent Application No. 202111401211.2, filed on Nov. 19, 2021, the entire content of which is incorporated herein by reference.

TECHNICAL FIELD

The disclosure relates to the field of control technologies, and more particularly, to a method for controlling an electronic device, an electronic device and a readable storage medium.

BACKGROUND

During a process of transmitting radio waves from an electronic device such as a mobile phone to a base station, it may have an impact on human health if a power of the electronic device exceeds a certain intensity. Thus, a transmission function of the electronic device needs to comply with relevant regulations regarding specific absorption rate (SAR).

For this reason, a method of time-averaged SAR is provided in the related art. The electronic device can transmit with a full power Pmax in a certain duration in a time window and transmit with a difference between a power Plimit and a margin (i.e. Plimit-margin) in another duration in the same time window while ensuring that the average power in this time window is not greater than Plimit. Plimit refers to a fixed power upper limit value and margin refers to a descent adjustment value. The International Commission on Non-Ionizing Radiation Protection (ICNIRP) and the Federal Communications Commission (FCC) have different time windows, take a frequency band of sub6G as an example, the time window in ICNIRP is 360 s and the time window in FCC is 100 s.

SUMMARY

According to a first aspect of the disclosure, a method for controlling an electronic device is provided. The method is applicable to an electronic device. The method includes: obtaining a service scenario of the electronic device; determining an upper limit value and/or a lower limit value of transmit power based on the service scenario; controlling the electronic device to transmit and receive signals by using the transmit power, and making an average value of the transmit power satisfy an SAR requirement.

According to a second aspect of the disclosure, an electronic device is provided. The electronic device includes: a processor; and a memory for storing computer programs executable by the processor; in which the processor is configured to execute the computer programs stored in the memory to perform the method as described above.

According to a third aspect of the disclosure, a non-transitory computer-readable storage medium is provided. When executable computer programs in the storage medium are executed by a processor, the method as described above is performed.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims. It should be noted that features in the following embodiments and implementations can be combined with each other without conflict.

In the related art, when the back off power (back off) under the SAR scenario, that is, the difference between Plimit and Pmax is large, the electronic device keeps transmitting for a long duration with a power of Plimit-margin in the time window, resulting in an uplink signal deterioration within this duration. For example, there are problems such as silence or dropped calls during real-time services such as calls.

Figure 1:
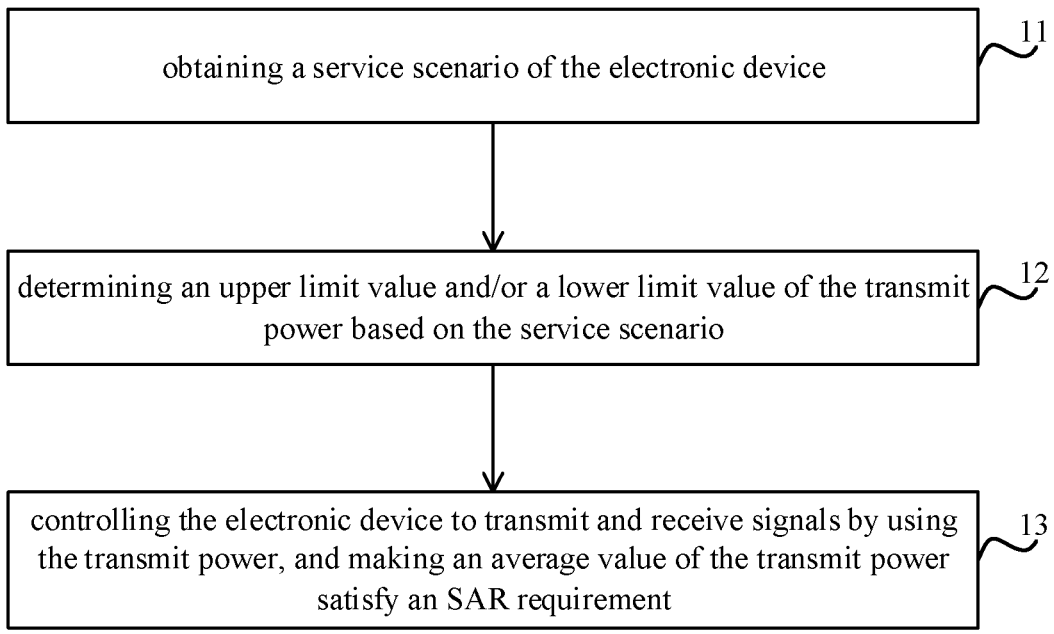
FIG. 1 is a flowchart of a method for controlling an electronic device according to embodiments.

To solve the above technical problems, embodiments of the disclosure provide a method for controlling an electronic device. FIG. 1 is a flowchart of a method for controlling an electronic device according to embodiments. Referring to FIG. 1, the method includes steps 11 to 13.

In step 11, a service scenario of the electronic device is obtained.

In some embodiments, the electronic device may obtain a type of a current service. When the type of the current service is a non-continuous and/or non-real-time type, such as a web page, a microblog, the electronic device may determine that the service scenario of the electronic device is a first service scenario. When the type of the current service is a continuous and real-time type, such as calling, gaming, uploading data, the electronic device may determine that the service scenario of the electronic device is a second service scenario.

In step 12, an upper limit value and/or a lower limit value of the transmit power is determined based on the service scenario.

In some embodiments, the electronic device may determine the upper limit value and/or the lower limit value of the transmit power of the electronic device based on the service scenario. The upper limit value of the transmit power refers to a maximum value of the power that the electronic device is allowed to transmit in a first duration of a time window, namely Pmax, and the lower limit value of the transmit power refers to a minimum value of the power that the electronic device is allowed to transmit in a second duration of the time window, namely Pmin. The first duration and the second duration constitute the time window. A ratio of the first duration to the time window is a duty ratio of the upper limit value of the transmit power, and a ratio of the second duration to the time window is a duty ratio of the lower limit value of the transmit power. It can be understood that the third party can be determined when two of the upper limit value, the lower limit value, the average value and the duty ratio are determined.

Figure 2:
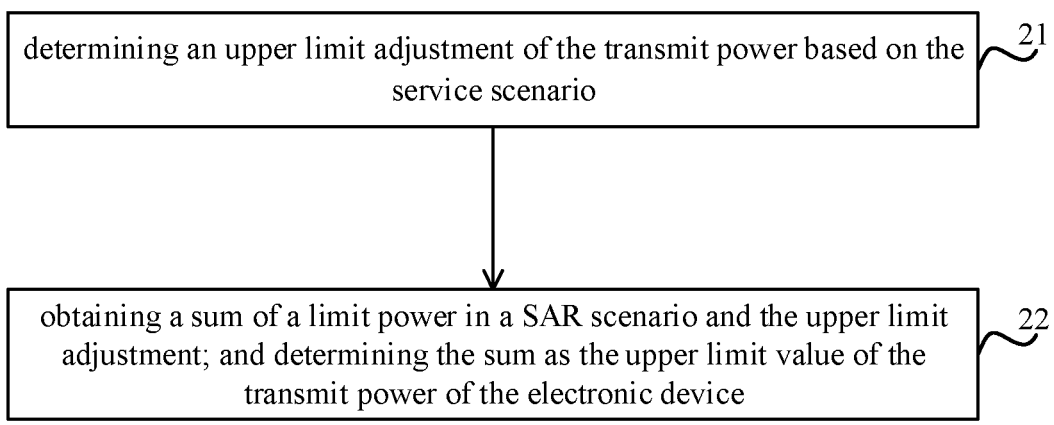
FIG. 2 is a flowchart of obtaining an upper limit adjustment according to embodiments.

In an example, the electronic device may determine the upper limit value of the transmit power of the electronic device based on the service scenario while keeping the lower limit value unchanged. Referring to FIG. 2, steps 21 and 22 are included. In step 21, the electronic device determines an upper limit adjustment of the transmit power based on the service scenario. The upper limit adjustment refers to the amount of power variation that the transmit power can increase on the basis of the limit power Plimit corresponding to the SAR scenario, that is, the power part that exceeds the limit power. Combining with the definition of the upper limit adjustment, it can be known that the value of the upper limit adjustment is between 0 and a back off power, that is, the delta is at [0, back off]. For example, when the service scenario is the first service scenario, the electronic device may determine that the upper limit adjustment is a first preset adjustment. For another example, when the service scenario is the second service scenario, the electronic device may determine that the upper limit adjustment is a second preset adjustment. The second preset adjustment is less than the first preset adjustment.

Figure 3:
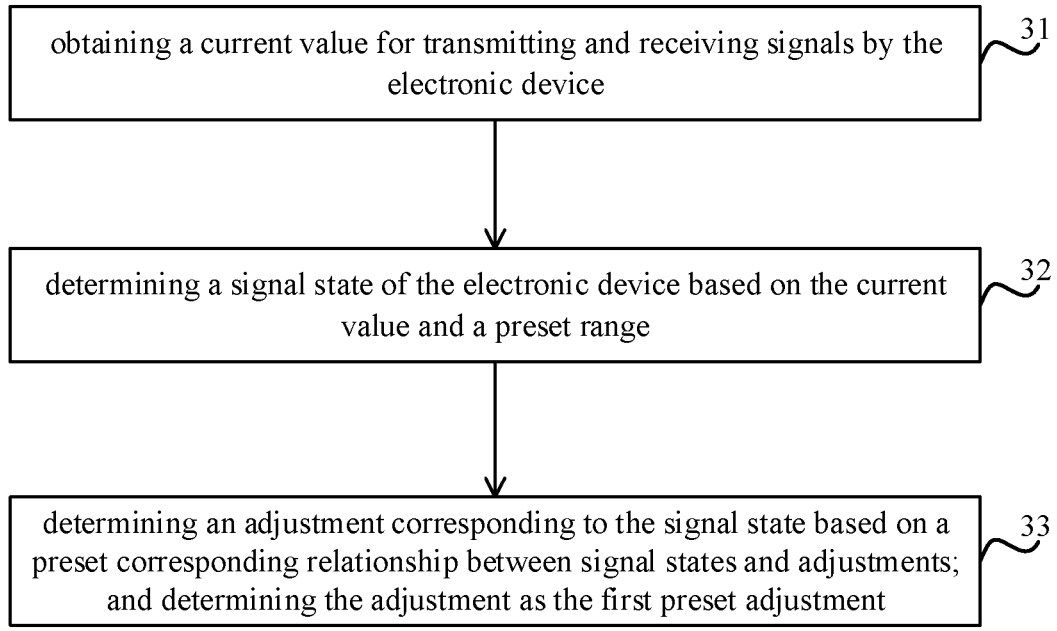
FIG. 3 is a flowchart of obtaining an adjustment according to embodiments.

In this example, the above-mentioned first preset adjustment can be set to a fixed value (such as 5 dBm) or can be set to a dynamic value. When the first preset adjustment is the dynamic value, referring to FIG. 3, the electronic device can obtain it through steps 31 to 33. In step 31, the electronic device obtains a current value for transmitting and receiving signals by the electronic device. The above current value may be a strength of a transmitted signal, a strength of a received signal, or a quality of a channel between a terminal and a base station, which may be selected based on specific scenarios and not limited herein. Taking the current value being the strength of the transmitted signal ($SI_{Tx}$) and the strength of the received signal ($SI_{Rx}$) as an example, the electronic device can input the strength of the transmitted signal and the strength of the received signal into the preset formula $y = a\, SI_{Tx} + b\, SI_{Rx} + c$ after obtaining the strength of the transmitted signal and the strength of the received signal to obtain the current value y. Of course, those skilled in the art can adjust the calculation manner according to the content of the current value, and the corresponding solution may fall within the protection scope of the disclosure.

In step 32, the electronic device determines a signal state of the electronic device based on the current value and a preset range. Continuing to take the current value being the strength of the transmitted signal ($SI_{Tx}$) and the strength of the received signal ($SI_{Rx}$) as an example, the electronic device can set three preset ranges, namely a first preset range, a second preset range and a third preset range. The first preset range, the second preset range and the third preset range decrease in sequence, and the three preset ranges constitute a value range of the current value. After obtaining the current value, the electronic device can compare the current value with a size of each preset range, determine which preset range the current value is within, and determine the signal state based on the preset range.

For example, when the current value is within the first preset range, the electronic device may determine that the signal state is a strong signal state. For another example, when the current value is within the second preset range, the electronic device may determine that the signal state is a general signal state. For another example, when the current value is within the third preset range, the electronic device may determine that the signal state is a weak signal state. It should be noted that the signal states can be set according to specific scenarios, for example, four signal states, and the corresponding solution may fall within the protection scope of the disclosure.

TABLE 1 a correspondence between signal states and adjustments

| signal state | adjustments | range |
| --- | --- | --- |
| strong signal state | first adjustment | [7, 9] |
| general signal state | second adjustment | [4, 6] |
| weak signal state | third adjustment | (0, 3] |

In step 33, the electronic device determines an adjustment corresponding to the signal state based on a preset corresponding relationship between signal states and adjustments and determine the adjustment as the first preset adjustment. In this example, the corresponding relationship between signal states and adjustments may be stored in the electronic device, and Table 1 shows the correspondence.

After obtaining the signal state, the electronic device can determine the adjustment corresponding to the signal state based on the signal state and the above-mentioned corresponding relationship. For example, when the signal state is the strong signal state, the electronic device may determine that the adjustment corresponding to the signal state is the first adjustment. For another example, when the signal state is the general signal state, the electronic device may determine that the adjustment corresponding to the signal state is the second adjustment. When the signal state is the weak signal state, the electronic device may determine that the adjustment corresponding to the signal state is the third adjustment.

In this way, in this example, different adjustments can be set at different signal strengths, that is, the adjustment becomes smaller as the signal becomes weaker, which is conducive to reducing the size of the transmit power, so as to avoid that the duty ratio of the transmit power in the descent duration (that is, the second duration in the time window) is too large and avoid the problem of uplink signal deterioration.

In another example, when the type of the current scenario is the second service scenario, the electronic device may determine that the upper limit adjustment is the second preset adjustment, and the second preset adjustment is smaller than the first preset adjustment. For example, when the first preset adjustment is 7 dBm, the second preset adjustment may be set to 5 dBm. In this way, in this example, the second preset adjustment can be set for the second service scenario, which is smaller than the first preset adjustment, and the size of the transmit power can be further reduced, so as to avoid that the duty ratio of the transmit power in the descent duration is too large. It is helpful to improve the quality of the uplink signal and avoid problems such as dropped calls.

Figure 4:
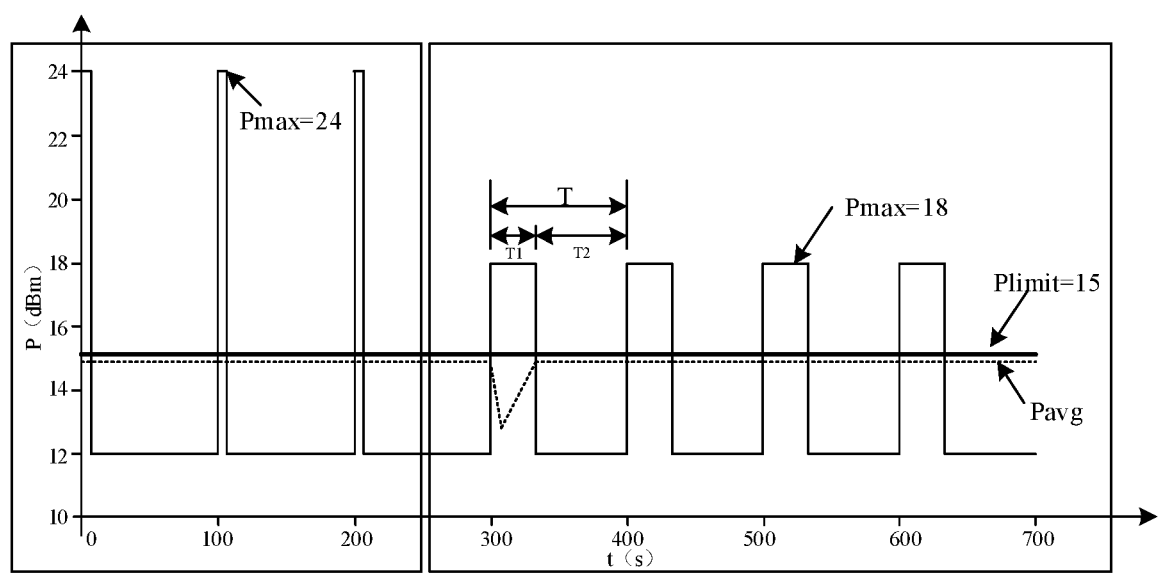
FIG. 4 is a schematic diagram illustrating an effect of adjusting an upper limit adjustment according to embodiments.

In step 22, the electronic device obtains a sum of a limit power in a SAR scenario and the upper limit adjustment; and determine the sum as the upper limit value of the transmit power of the electronic device. The electronic device may determine the transmit power of the electronic device in the first duration of the time window based on the limit power in the SAR scenario and the upper limit adjustment. For example, if the limit power Plimit is 15 dBm and the upper limit adjustment is 3 dBm, the transmit power Pmax of the electronic device is 15+3=18 dBm and the effect is shown in FIG. 4. Referring to FIG. 4, the left side shows that the back off power in the related art is 9 dBm, and Pmax=Plimit+back off=15+9=24 dBm; and the right side (i.e., the white part of the background) shows that the upper limit adjustment in the disclosure is 3 dBm, and Pmax=15+3=18 dBm. A comparison of the left and right sides of FIG. 4 shows that the transmit power of the electronic device in the first duration T1 of the time window T decreases by 24−18=6 dBm, and the transmit duration in the first duration of the time window increases. Therefore, the transmit duration in the second duration T2 of the time window in the light side in FIG. 4 is narrower than that in the left, that is, the duty ratio of the transmit duration in the second duration is reduced. The first duration T1 and the second duration T2 constitute the time window T, that is, T=T1+T2.

Figure 5:
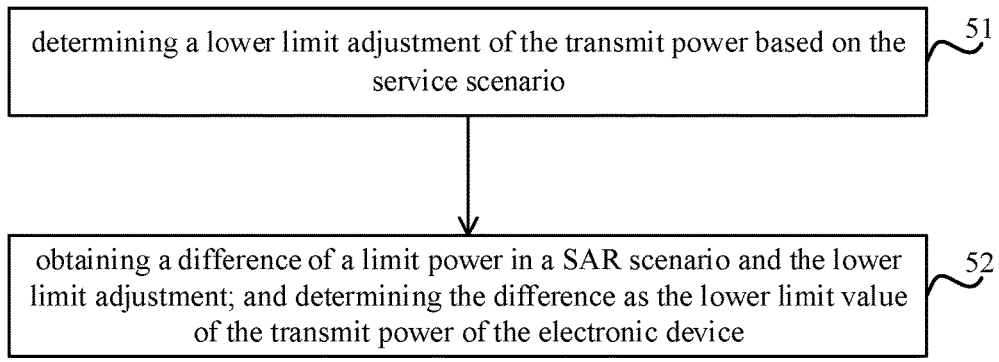
FIG. 5 is a flowchart of obtaining a lower limit adjustment according to embodiments.

In another example, the electronic device may determine the lower limit value of the transmit power of the electronic device based on the service scenario while keeping the upper limit value unchanged. Referring to FIG. 5, steps 51 and 52 are included. In step 51, the electronic device determines a lower limit adjustment of the transmit power based on the service scenario. The lower limit adjustment refers to the amount of power variation that the transmit power can reduce on the basis of the limit power Plimit corresponding to the SAR scenario, that is, the power part that lows the limit power. In step 52, the electronic device obtains a difference of a limit power in a SAR scenario and the lower limit adjustment; and determine the difference as the lower limit value of the transmit power of the electronic device.

It should be understood that the above-mentioned second preset adjustment can be set to a fixed value (e.g., 3 dBm) or can be set to a dynamic value. When the second preset adjustment is the dynamic value, the corresponding setting manner can refer to the setting manner of the first preset adjustment, that is, the value of the second preset adjustment is determined based on the signal state of the electronic device. When the second duration is shortened or the transmit power in the second duration is increased, the obtained value of the second preset adjustment all falls within the protection scope of the disclosure.

In an example, when the descent adjustment is the dynamic value, the electronic device may determine it based on the current service scenario. For example, when the service scenario is the first service scenario, the electronic device may determine that the lower limit adjustment is a second preset adjustment (e.g., 4 dBm). For another example, when the service scenario is the second service scenario, the electronic device may determine that the lower limit adjustment is a third preset adjustment (e.g., 1 dBm). In this example, the second preset adjustment is greater than the third preset adjustment.

Figure 6:
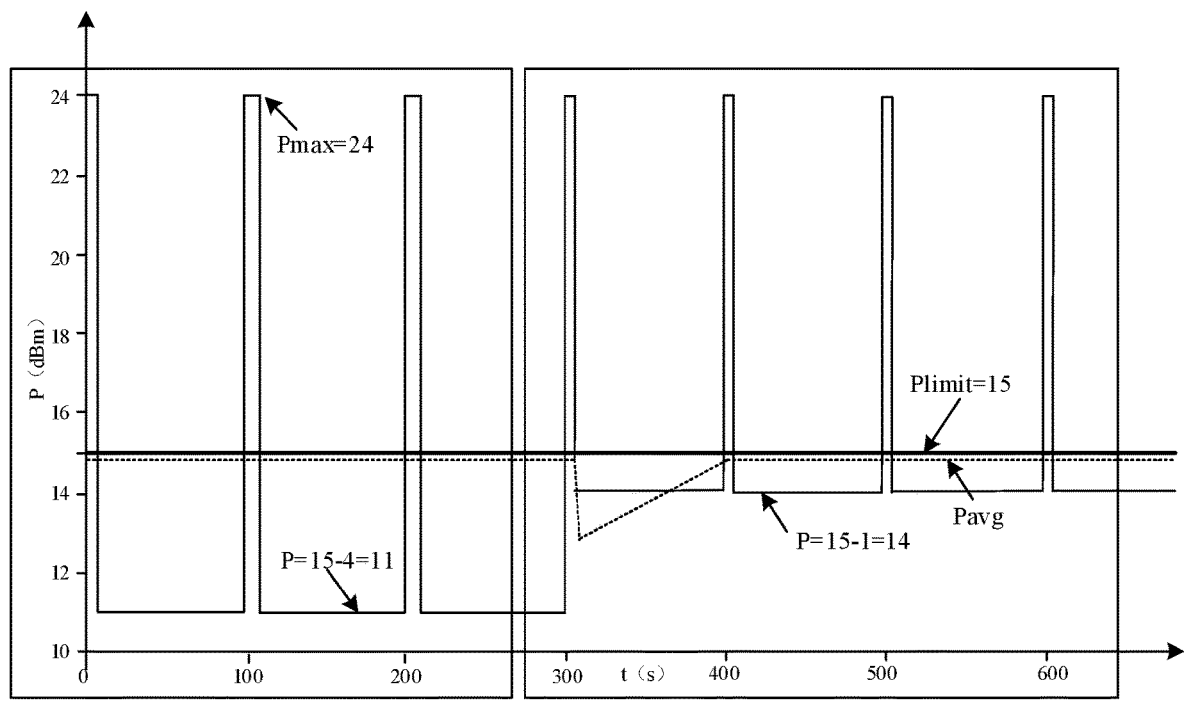
FIG. 6 is a schematic diagram illustrating an effect of adjusting a lower limit adjustment according to embodiments.

It should be noted that setting the second preset adjustment greater than the third preset adjustment is to provide a larger descent transmit power to the second service scenario, that is, the transmit power in the second duration of the time window becomes bigger. Referring to FIG. 6, the left corresponds to the first service scenario, the descent adjustment is 4 dBm, and the transmit power of the electronic device is 15−4=11 dBm; while the left corresponds to the second service scenario, the descent adjustment is 1 dBm, the transmit power of the electronic device is 15−1=14 dBm, and the transmit power in the second duration is raised.

Figure 7:
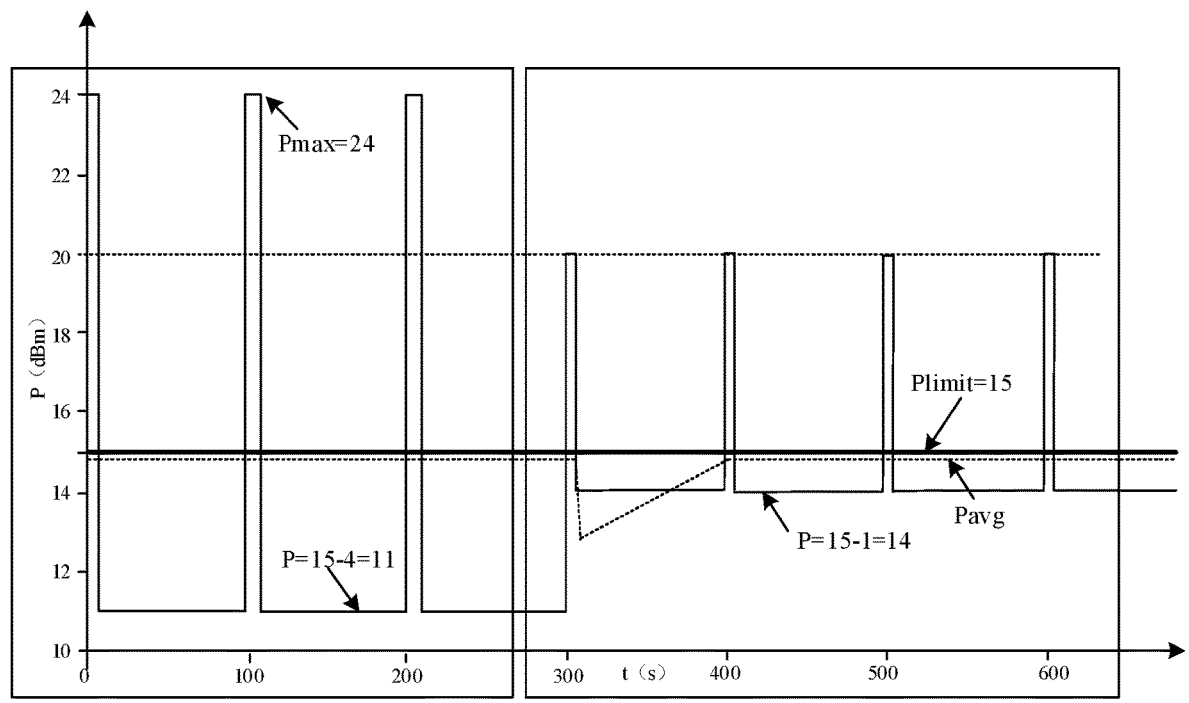
FIG. 7 is a schematic diagram showing an effect of a ratio of a transmit duration of a second duration, accounting for 100%, according to embodiments.
Figure 8:
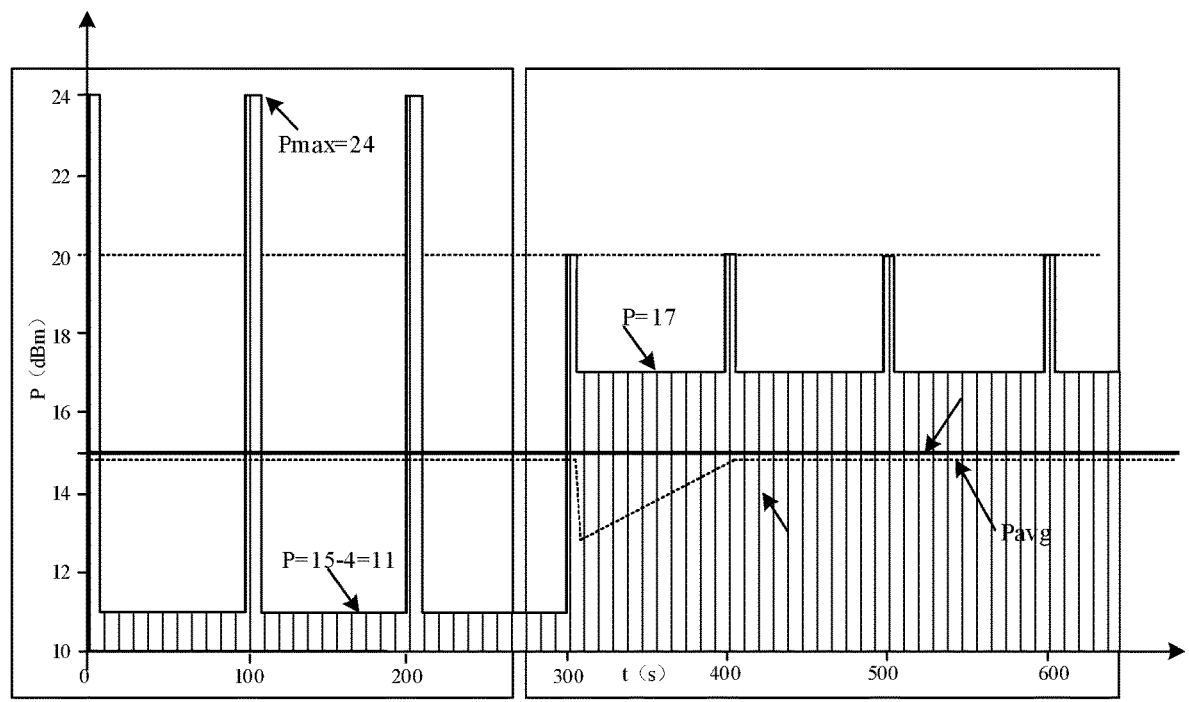
FIG. 8 is a schematic diagram showing an effect of a ratio of a transmit duration of a second duration, accounting for 50%, according to embodiments.

In another example, in the second duration of the time window, if the electronic device continues to transmit signals, the duty ratio of the transmit duration is 100%, and the effect is shown in FIG. 7. When the duty ratio of the transmit duration is less than 100% and is a target ratio (e.g., 50%), the effect is shown in FIG. 8, and the electronic device can determine that the descent adjustment is the fourth preset adjustment (e.g., 5 dBm). The fourth preset adjustment, the second preset adjustment and the third preset adjustment decrease sequentially. In this example, the reason for setting the fourth preset adjustment to be greater than the second preset adjustment is that when the average value of the transmit power remains unchanged, since there is a case that the transmit power is 0 in the second duration, see FIG. 7, at this time, during the signal transmission period, the transmit power can be increased from P=14 dBm in FIGS. 7 to P=17 dBm in FIG. 8, so as to avoid the continuous low transmit power causing the communication quality deterioration.

In this way, in this example, different second preset adjustment can be set at different signal strengths, that is, the adjustment becomes larger as the signal becomes weaker, which is conducive to increasing the transmit power or reducing the ratio of the descent, to avoid that the duty ratio of the transmit power in the descent duration (that is, the second duration in the time window) is too large and avoid the problem of uplink signal deterioration.

In yet another embodiment, the electronic device can adjust the upper limit value and the lower limit value of the transmit power at the same time, and the adjustment manner can refer to the content of embodiments shown in FIG. 2 to FIG. 7, which is not be repeated herein.

In step 13, the electronic device is controlled to transmit and receive signals by using the transmit power, and an average value of the transmit power is made to satisfy an SAR requirement.

The solutions provided by embodiments of the disclosure can obtain the service scenario of the electronic device; determine the upper limit value and/or the lower limit value of the transmit power based on the service scenario; control the electronic device to transmit and receive signals by using the transmit power, and make the average value of the transmit power satisfy the SAR requirement. In this way, in the embodiments, the electronic device does not need to transmit signals at the full power, and when the average value of the transmit power is constant, the ratio of the descent duration of the transmit power can be reduced, which is beneficial to improve a signal quality and avoid occurrences of silence or dropped calls, to improve the experience of using the electronic device. In addition, based on the beneficial effects of embodiments in FIG. 1, the solutions provided by embodiments of the disclosure can also increase the descent transmit power by setting the descent adjustment, which is beneficial to improve the signal quality, so as to avoid the occurrence of dropped calls and the like.

Based on the method for controlling an electronic device provided in embodiments of the disclosure, embodiments of the disclosure further provide an apparatus for controlling an electronic device. The apparatus is applicable to an electronic device. The apparatus includes: a service scenario obtaining module, configured to obtain a service scenario of the electronic device; a transmit power determining module, configured to determine an upper limit value and/or a lower limit value of the transmit power based on the service scenario; a signal controlling module, configured to control the electronic device to transmit and receive signals by using the transmit power, and make an average value of the transmit power satisfy an SAR requirement.

Alternatively, the service scenario obtaining module includes: a service scenario type obtaining unit, configured to obtain a type of a current service in the electronic device; and a service scenario determining unit, configured to determine that the service scenario is a first service scenario in response to the type of the current service being a non-continuous and/or non-real-time type; and determine that the service scenario is a second service scenario in response to the type of the current service being a continuous and real-time type.

Alternatively, the transmit power determining module includes: an upper limit adjustment determining unit, configured to determine an upper limit adjustment of the transmit power based on the service scenario; and an upper limit value determining unit, configured to obtain a sum of a limit power in a SAR scenario and the upper limit adjustment; and determine the sum as the upper limit value of the transmit power of the electronic device.

Alternatively, the upper limit adjustment determining unit includes: a first determining subunit, configured to determine that the upper limit adjustment is a first preset adjustment in response to the service scenario being a first service scenario; and a second determining subunit, configured to determine that the upper limit adjustment is a second preset adjustment in response to the service scenario being a second service scenario, in which the second preset adjustment is less than the first preset adjustment.

Alternatively, the apparatus further includes an adjustment setting module configured to set the first preset adjustment, in which the adjustment setting module includes: a current value obtaining unit, configured to obtain a current value for transmitting and receiving signals by the electronic device; a signal state determining unit, configured to determine a signal state of the electronic device based on the current value and a preset range; an adjustment setting unit, configured to determine an adjustment corresponding to the signal state based on a preset corresponding relationship between signal states and adjustments; and determine the adjustment as the first preset adjustment.

Alternatively, the signal state determining unit includes: a first determining subunit, configured to determine that the signal state is a strong signal state in response to the current value being within a first preset range; a second determining subunit, configured to determine that the signal state is a general signal state in response to the current value being within a second preset range; a third determining subunit, configured to determine that the signal state is a weak signal state in response to the current value being within a third preset range, in which the first preset range, the second preset range and the third preset range decrease sequentially.

Alternatively, the adjustment setting unit includes: a first adjustment determining subunit, configured to determine that the adjustment corresponding to the signal state is a first adjustment in response to the signal state being the strong signal state; a second adjustment determining subunit, configured to determine that the adjustment corresponding to the signal state is a second adjustment in response to the signal state being the general signal state; and a third adjustment determining subunit, configured to determine that the adjustment corresponding to the signal state is a third adjustment in response to the signal state being the weak signal state, in which the first adjustment, the second adjustment and the third adjustment decrease sequentially.

Alternatively, the transmit power determining module includes: a lower limit adjustment determining unit, configured to determine a lower limit adjustment of the transmit power based on the service scenario; a lower limit value determining unit, configured to obtain a difference of a limit power in a SAR scenario and the lower limit adjustment; and determine the difference as the lower limit value of the transmit power of the electronic device.

Alternatively, the lower limit adjustment determining unit includes: a second adjustment determining subunit, configured to determine that the lower limit adjustment is a second preset adjustment in response to the service scenario being a first service scenario; and a third adjustment determining subunit, configured to determine that the lower limit adjustment is a third preset adjustment in response to the service scenario being a second service scenario, in which the second preset adjustment is greater than the third preset adjustment.

Alternatively, the transmit power determining module is further configured to determine the upper limit value and/or the lower limit value of the transmit power becomes larger in response to a duty ratio of a transmission duration of the transmit power becomes smaller.

It should be noted that apparatuses and devices in some embodiments match the content of the method embodiments, and reference should be made to the above-mentioned method embodiments, which may not be repeated herein.

Figure 9:
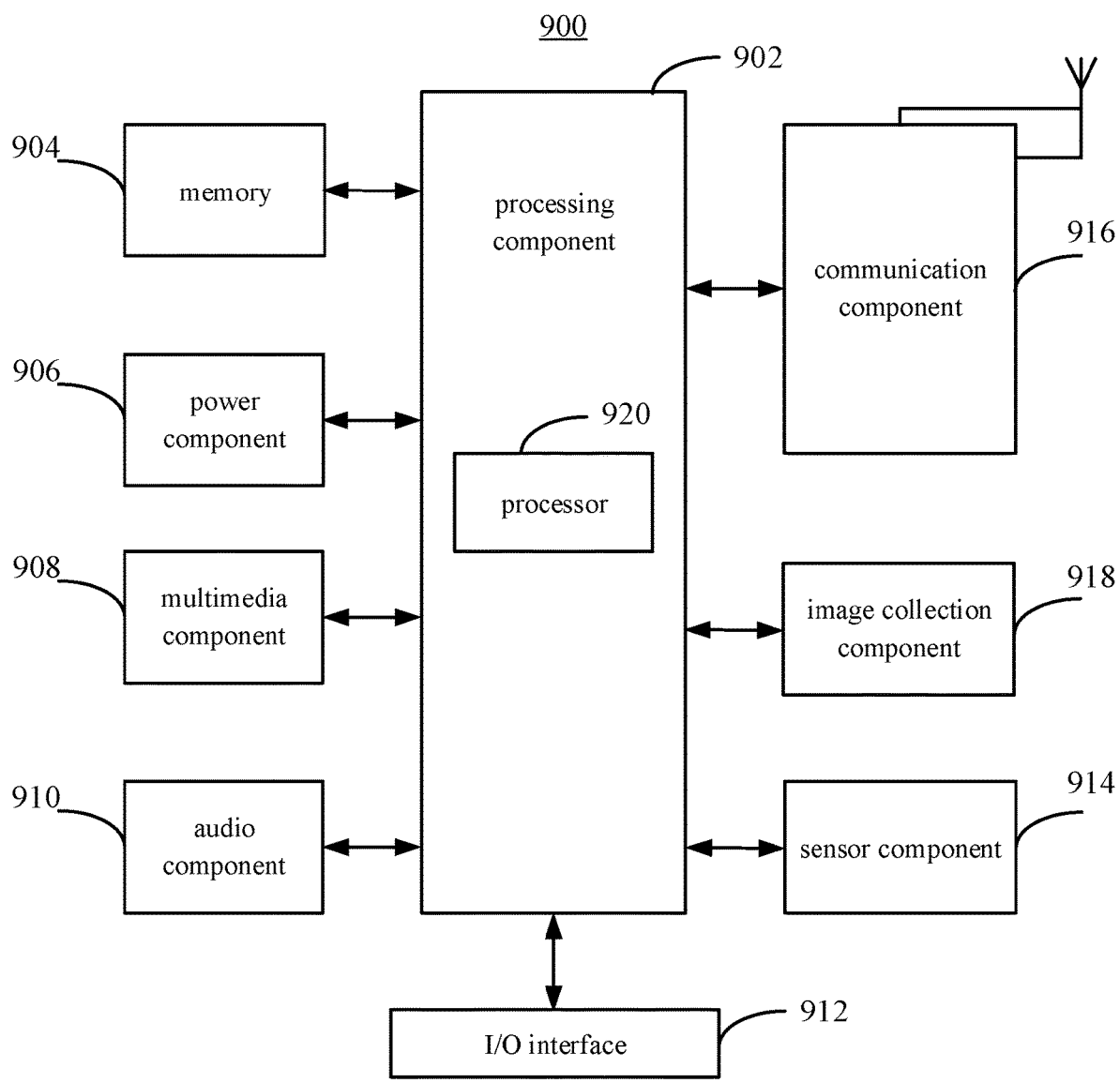
FIG. 9 is a block diagram of an electronic device according to embodiments.

FIG. 9 is a block diagram of an electronic device according to embodiments. For example, the electronic device 900 may be a mobile phone, a computer, a digital broadcast terminal, a tablet, a medical device, exercise equipment, a personal digital assistant, and the like.

Referring to FIG. 9, the electronic device 900 may include one or more of the following components: a processing component 902, a memory 904, a power component 906, a multimedia component 908, an audio component 910, an input/output (I/O) interface 912, a sensor component 914, a communication component 916, and an image collection component 918.

The processing component 902 typically controls overall operations of the electronic device 900, such as the operations associated with display, telephone calls, data communications, camera operations, and recording operations. The processing component 902 may include one or more processors 920 to perform computer programs. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the electronic device 900. Examples of such data include computer programs for any applications or methods operated on the electronic device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the electronic device 900. The power component 906 may include a power management system, one or more power sources, and any other components associated with the generation, management, and distribution of power in the electronic device 900. The power component 906 may include a power chip, and the controller may communicate with the power chip, so as to control the power chip to turn on or off a switching device, so that the battery supplies power to the main board circuit or does not supply power.

The multimedia component 908 includes a screen providing an output interface between the electronic device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action.

The audio component 910 is configured to output and/or input audio signals. For example, the audio component 910 includes a microphone ("MIC") configured to receive an external audio signal when the electronic device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like.

The sensor component 914 includes one or more sensors to provide status assessments of various aspects of the electronic device 900. For instance, the sensor component 914 may detect an open/closed status of the electronic device 900, relative positioning of components, e.g., the display and the keypad, of the electronic device 900, a change in position of the electronic device 900 or a component of the electronic device 900, a presence or absence of user contact with the electronic device 900, an orientation or an acceleration/deceleration of the electronic device 900, and a change in temperature of the electronic device 900. The sensor component 914 may include a magnetic force sensor, a gyroscope and a magnetic field sensor. The magnetic field sensor includes at least one of the following: a Hall sensor, a thin film magnetoresistive sensor and a magnetic liquid acceleration sensor.

The communication component 916 is configured to facilitate communication, wired or wirelessly, between the electronic device 900 and other devices. The electronic device 900 can access a wireless network based on a communication standard, such as WiFi, 2G, 3G, 4G, 5G, or a combination thereof. In some embodiments, the communication component 916 receives a broadcast signal or broadcast associated information from an external broadcast management system via a broadcast channel. In some embodiments, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In embodiments, the electronic device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components.

In some embodiments, there is also provided a computer-readable storage medium, such as the memory 904 including instructions, and the instructions can be executable by the processor. For example, the computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for controlling an electronic device, comprising:
    obtaining a service scenario of the electronic device;
    determining an upper limit value of a transmit power based on the service scenario;
    controlling the electronic device to transmit and receive signals by using the transmit power, and making an average value of the transmit power satisfy a specific absorption rate (SAR) requirement;
    wherein determining the upper limit value of the transmit power comprises:
    determining an upper limit adjustment of the transmit power based on the service scenario;
    obtaining a sum of a limit power in a SAR scenario and the upper limit adjustment;
    determining the sum as the upper limit value of the transmit power of the electronic device;

determining that the upper limit adjustment is a first preset adjustment in response to the service scenario being a first service scenario; and determining that the upper limit adjustment is a second preset adjustment in response to the service scenario being a second service scenario, wherein the second preset adjustment is less than the first preset adjustment;

setting the first preset adjustment, comprising:

obtaining a current value for transmitting and receiving signals by the electronic device;

determining a signal state of the electronic device based on the current value and a preset range;

determining an adjustment corresponding to the signal state based on a preset corresponding relationship between signal states and adjustments; and determining the adjustment as the first preset adjustment.

2. The method as claimed in claim 1, wherein obtaining the service scenario of the electronic device comprises:

obtaining a type of a current service in the electronic device;

determining that the service scenario is the first service scenario in response to the type of the current service being at least one of a non-continuous type or a non-real-time type; and determining that the service scenario is the second service scenario in response to the type of the current service being a continuous and real-time type.

3. The method as claimed in claim 1, wherein determining the signal state of the electronic device based on the current value and the preset range comprises:

determining that the signal state is a strong signal state in response to the current value being within a first preset range;

determining that the signal state is a general signal state in response to the current value being within a second preset range;

determining that the signal state is a weak signal state in response to the current value being within a third preset range, wherein the first preset range, the second preset range and the third preset range decrease sequentially.

4. The method as claimed in claim 3, wherein determining the adjustment corresponding to the signal state based on the preset corresponding relationship between signal states and adjustments comprises:

determining that the adjustment corresponding to the signal state is a first adjustment in response to the signal state being the strong signal state;

determining that the adjustment corresponding to the signal state is a second adjustment in response to the signal state being the general signal state; and determining that the adjustment corresponding to the signal state is a third adjustment in response to the signal state being the weak signal state, wherein the first adjustment, the second adjustment and the third adjustment decrease sequentially.

5. The method as claimed in claim 1, further comprising: determining the lower limit value of the transmit power based on the service scenario, and determining the lower limit value of the transmit power comprises:

determining a lower limit adjustment of the transmit power based on the service scenario;

obtaining a difference of the limit power in the SAR scenario and the lower limit adjustment; and determining the difference as the lower limit value of the transmit power of the electronic device.

6. The method as claimed in claim 5, wherein determining the lower limit adjustment of the transmit power based on the service scenario comprises:

determining that the lower limit adjustment is the second preset adjustment in response to the service scenario being the first service scenario; and determining that the lower limit adjustment is a third preset adjustment in response to the service scenario being the second service scenario, wherein the second preset adjustment is greater than the third preset adjustment.

7. The method as claimed in claim 1, further comprising:

determining the upper limit value or the lower limit value of the transmit power becomes larger in response to a duty ratio of a transmission duration of the transmit power becomes smaller.

8. An electronic device, comprising:

a processor; and a memory for storing computer programs executable by the processor;

wherein the processor is configured to execute the computer programs stored in the memory to perform:

obtaining a service scenario of the electronic device;

determining an upper limit value of a transmit power based on the service scenario;

controlling the electronic device to transmit and receive signals by using the transmit power, and making an average value of the transmit power satisfy a specific absorption rate (SAR) requirement;

wherein the processor is configured to execute the computer programs stored in the memory to further perform:

determining an upper limit adjustment of the transmit power based on the service scenario;

obtaining a sum of a limit power in a SAR scenario and the upper limit adjustment;

determining the sum as the upper limit value of the transmit power of the electronic device;

determining that the upper limit adjustment is a first preset adjustment in response to the service scenario being a first service scenario; and determining that the upper limit adjustment is a second preset adjustment in response to the service scenario being a second service scenario, wherein the second preset adjustment is less than the first preset adjustment;

setting the first preset adjustment, comprising:

obtaining a current value for transmitting and receiving signals by the electronic device;

determining a signal state of the electronic device based on the current value and a preset range;

determining an adjustment corresponding to the signal state based on a preset corresponding relationship between signal states and adjustments; and determining the adjustment as the first preset adjustment.

9. The device as claimed in claim 8, wherein the processor is configured to execute the computer programs stored in the memory to further perform:

obtaining a type of a current service in the electronic device;

determining that the service scenario is the first service scenario in response to the type of the current service being at least one of a non-continuous type or a non-real-time type; and determining that the service scenario is the second service scenario in response to the type of the current service being a continuous and real-time type.

10. The device as claimed in claim 8, wherein the processor is configured to execute the computer programs stored in the memory to further perform:
- determining that the signal state is a strong signal state in response to the current value being within a first preset range;
- determining that the signal state is a general signal state in response to the current value being within a second preset range;
- determining that the signal state is a weak signal state in response to the current value being within a third preset range,
- wherein the first preset range, the second preset range and the third preset range decrease sequentially.

11. The device as claimed in claim 10, wherein the processor is configured to execute the computer programs stored in the memory to further perform:
- determining that the adjustment corresponding to the signal state is a first adjustment in response to the signal state being the strong signal state;
- determining that the adjustment corresponding to the signal state is a second adjustment in response to the signal state being the general signal state; and
- determining that the adjustment corresponding to the signal state is a third adjustment in response to the signal state being the weak signal state,
- wherein the first adjustment, the second adjustment and the third adjustment decrease sequentially.

12. The device as claimed in claim 8, wherein the processor is configured to execute the computer programs stored in the memory to further perform:
- determining a lower limit value of the transmit power based on the service scenario, wherein determining the lower limit value of the transmit power comprises:
- determining a lower limit adjustment of the transmit power based on the service scenario;
- obtaining a difference of the limit power in the SAR scenario and the lower limit adjustment; and
- determining the difference as the lower limit value of the transmit power of the electronic device.

13. The device as claimed in claim 12, wherein the processor is configured to execute the computer programs stored in the memory to further perform:
- determining that the lower limit adjustment is the second preset adjustment in response to the service scenario being the first service scenario; and
- determining that the lower limit adjustment is a third preset adjustment in response to the service scenario being the second service scenario,
- wherein the second preset adjustment is greater than the third preset adjustment.

14. A non-transitory computer-readable storage medium having stored therein instructions that, when executed by a processor of an electronic device, causes the processor to perform:
- obtaining a service scenario of the electronic device;
- determining an upper limit value of a transmit power based on the service scenario;
- controlling the electronic device to transmit and receive signals by using the transmit power, and making an average value of the transmit power satisfy a specific absorption rate (SAR) requirement;
- wherein determining the upper limit value of the transmit power comprises:
- determining an upper limit adjustment of the transmit power based on the service scenario;
- obtaining a sum of a limit power in a SAR scenario and the upper limit adjustment; and
- determining the sum as the upper limit value of the transmit power of the electronic device;
- determining that the upper limit adjustment is a first preset adjustment in response to the service scenario being a first service scenario; and
- determining that the upper limit adjustment is a second preset adjustment in response to the service scenario being a second service scenario,
- wherein the second preset adjustment is less than the first preset adjustment;
- setting the first preset adjustment, comprising:
- obtaining a current value for transmitting and receiving signals by the electronic device;
- determining a signal state of the electronic device based on the current value and a preset range;
- determining an adjustment corresponding to the signal state based on a preset corresponding relationship between signal states and adjustments; and
- determining the adjustment as the first preset adjustment.

\* \* \* \* \*